US010906357B2

(12) United States Patent
Sgreccia et al.

(10) Patent No.: US 10,906,357 B2
(45) Date of Patent: Feb. 2, 2021

(54) AGRICULTURAL TIRE (71) Applicant: BRIDGESTONE CORPORATION, Tokyo (JP)

(72) Inventors: Mario Sgreccia, Rome (IT); Adriano Tedesco, Rome (IT); Fabrizio Peretti, Rome (IT)

(73) Assignee: BRIDGESTONE CORPORATION, Tokyo (JP)

(*) Notice: Subject to any disclaimer, the term of this patent is extended or adjusted under 35 U.S.C. 154(b) by 315 days.

(21) Appl. No.: 15/766,025

(22) PCT Filed: Oct. 20, 2016

(86) PCT No.: PCT/EP2016/075180
§ 371 (c)(1),
(2) Date: Apr. 5, 2018

(87) PCT Pub. No.: WO2017/072014
PCT Pub. Date: May 4, 2017

(65) Prior Publication Data
US 2018/0297415 A1 Oct. 18, 2018

(30) Foreign Application Priority Data
Oct. 29, 2015 (IT) .................. 102015000066713

(51) Int. Cl.
B60C 11/03 (2006.01)
(52) U.S. Cl.
CPC ... B60C 11/0316 (2013.01); B60C 2011/0313 (2013.01); B60C 2200/08 (2013.01)
(58) Field of Classification Search
CPC ......... B60C 11/0311; B60C 2011/0313; B60C 2011/133; B60C 2011/1338; B60C 11/0316; B60C 2200/08
See application file for complete search history.

(56) References Cited

U.S. PATENT DOCUMENTS

2014/0196823 A1* 7/2014 Vervaet ............... B60C 11/0311
152/209.12
2016/0193882 A1* 7/2016 Mancinelli .......... B60C 11/0332
152/209.12

FOREIGN PATENT DOCUMENTS

JP 60-145902 U 9/1985
JP 09-254609 A 9/1997
(Continued)

OTHER PUBLICATIONS

Written Opinion of the International Searching Authority of PCT/EP2016/075180 dated Jan. 30, 2017.
(Continued)

Primary Examiner — Robert C Dye
Assistant Examiner — Farah Taufiq
(74) Attorney, Agent, or Firm — Sughrue Mion, PLLC (57) ABSTRACT Tread (10) for agricultural tire (1) comprising a plurality of lugs protruding from the ground of the tread (11) in radially outer direction extending at a given inclination angle from a central portion of the tread toward both axial ends of the tread and alternately arranged at given intervals in the circumferential direction on one side and on the other with respect to the equatorial plane of the tire. The lugs (2) comprising a stepping-in surface (21) wherein the stepping-in surface (21) of at least one lug (2) comprises on its sidewall a first radially outer, concave surface (211) and a second, radially inner, concave surface (212) intersecting each other in a transition point (D) when viewed in a circumferential section.

20 Claims, 7 Drawing Sheets (56) References Cited

FOREIGN PATENT DOCUMENTS

JP 2008-018751 A 1/2008
WO 2015/015525 A1 2/2015

OTHER PUBLICATIONS

International Search Report of PCT/EP2016/075180 dated Jan. 30, 2017.

* cited by examiner

AGRICULTURAL TIRE

CROSS REFERENCE TO RELATED APPLICATIONS

This application is a National Stage of International Application No. PCT/EP2016/075180 filed Oct. 20, 2016, claiming priority based on Italian Patent Application No. 102015000066713 filed Oct. 29, 2015.

TECHNICAL FIELD OF THE INVENTION

The present invention pertains to a tread for an agricultural tire and particularly relates to an improved profile of its lugs.

BACKGROUND

Traction on the fields is one of the most important performances for agricultural tires besides wear on the roads. These performances have, not necessarily jointly, continuously been improved by providing new shapes of lugs on the tread of agricultural tires.

A lug, also called a bar, of an agriculture tire is defined as that element protruding from the ground of the tread and coming in contact with the pavement surface when the agriculture tire is operated on roads. A lug is also that element of an agriculture tire engaging with the mud or soil when the agriculture tire is operated on a field. In engaging with the mud or soil the lug provides the necessary traction to allow the longitudes movement of the tire during its rotation. Usually agriculture tires comprise a plurality of lugs.

The shape of the lugs on the tread of the agriculture tire, i.e. their inclination angle or curvature towards the circumferential direction of the tire, is one important feature to tune tire performances. In addition, further improvement can be achieved in providing a particular geometry of the sidewalls of the lugs, especially of the one of the stepping-in side of the lug, i.e. the one first coming in contact with the soil when the tire is rotating. The geometry of this sidewall is mostly responsible for the traction on soft or muddy soil.

For example, EP903249A1 discloses an agriculture pneumatic tire comprising a tread provided with lugs extending at a givers inclination angle from a central portion of the tread toward both ends of the tread. The lugs are alternately arranged right and left with respect to an equatorial plane of the tire at given intervals in the circumferential direction of the tire.

The same application discloses the sidewall of the stepping-in side of the lug consisting of a first flat surface slanted at a given angle and a second bored or concave surface, which surfaces intersect each other at a given elevation of the total lug height.

WO2015015525A1 discloses an agriculture tire comprising a tread provided with a plurality of ribs, each rib being provided with a front wall, wherein, on the front wall of the rib, a shaped profile is present, wherein the shaped profile has a section that defines at least one flat surface of the shaped profile which is parallel, or inclined at an angle a up to 20°, with respect to the surface of the head of the rib.

An important additional property of an agriculture tire is its ability of self-cleaning, i.e. the capability of removing the soil from between adjacent lugs on the tread without external intervention.

SUMMARY OF THE INVENTION

The technical problem underlying the present invention is therefore to provide a tread for agricultural tires allowing optimising tire performances with respect to the known art.

Above problem is solved by a tread for an agricultural tire according to claim 1.

Preferred features of the invention are recited in the dependent claims.

The tread of the invention comprises at least one lug with a lug profile improving traction on fields, wear on roads and tire self-cleaning performances at the same time. Such improvement is obtained by a variation of the lug profile along its axial length.

In particular, the lug profile improves the resistance to digging-in of the lug into mud or soil, thereby increasing the traction performances of the tire.

Moreover, the lug profile also increases the stiffness of the leg, thereby improving its resistance to wear.

The present invention encompasses also embodiments of treads wherein one or more lugs have said improved profiles and others have not. In particular, lugs having said improved profile can be arranged along the tire circumference as well as on the axially left and right side of the tire alternatingly with lugs having a conventional profile known in the art.

Furthermore, the tread according to the invention might comprise lugs having different improved profiles, each according to a preferred embodiment of present invention as disclosed in the following.

Other advantages, features and use modes of the present invention will result evident from the following detailed description of some embodiments, presented by way of example and not with limitative purpose.

BRIEF DESCRIPTION OF THE DRAWINGS

Reference will be made to the figures of the annexed drawing, wherein.

DETAILED DESCRIPTION OF PREFERRED EMBODIMENT OF THE INVENTION

Figure 1:
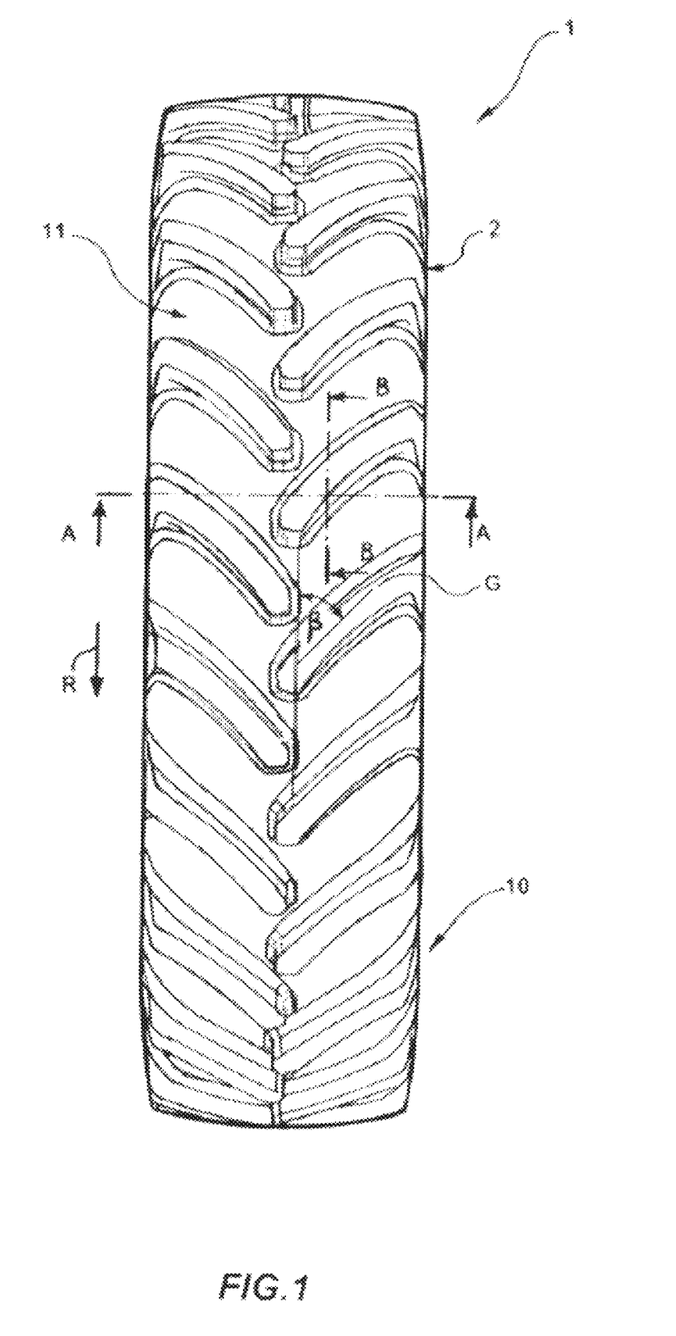
FIG. 1 shows an exemplary front view of an agricultural tire according to a first preferred embodiment of present invention.

FIG. 1 shows an agricultural tire 1 comprising a tread 10. The latter is provided with a plurality of lugs, one of which is denoted by way of example with 2. Each lug 2 protrudes from a ground 11 of tread 10 in a radially outer direction of the tire. The lugs are alternately arranged at given intervals in the circumferential direction of the tire on one side and on the other with respect to the equatorial plane of the tire.

Consistently with well-established terminology in the field, in the present context the "equatorial plane" of an agriculture tire is defined as the plane orthogonal to the rotation axis of the tires and passing through the axial middle of the tire.

Figure 4:
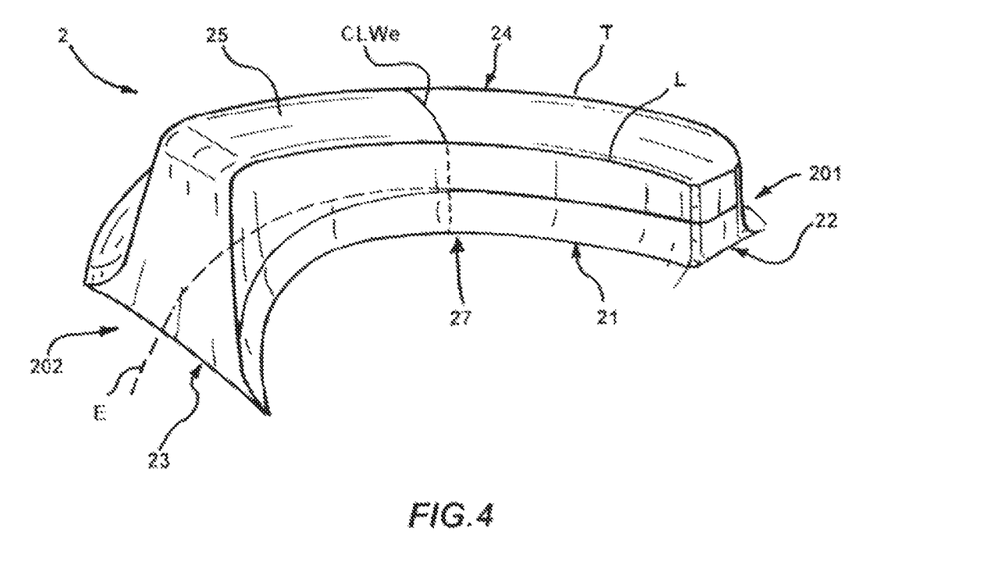
FIG. 4 shows an exemplary perspective view of a single lug of the tire of FIG. 1.

More particularly—and with reference also to FIG. 4—each lug 2 extends from a first end 201 in the axial central part of the tire, i.e. in the area of the equatorial plane, towards a second end 202 in the axial lateral part of the tire, i.e. the shoulder area of the tire. The area close to, and including, the first end 201 of the lug in the central area of the tire defines a so-called nose region, or nose, 22 of the lug. The area close to, and including, the second end 202 of the lug in the shoulder area of the tire is called the shoulder region, or shoulder, 23 of the lug.

The lug extends from the nose 22 to the shoulder 23 at a given inclination angle β with respect to the circumferential direction of the tire, i.e. with respect to said tire equator plane. Generally speaking, angle β is defined as the angle between the equatorial plane and a longitudinal axis, or average longitudinal axis, G of lug 2.

Preferably, lug 2 extends from the nose 22 to the shoulder 23 along a curvature. The distance from the first end 201 the lug to the second end 202 of the lug along the curvature of the lug is called axial length of the lug and is denoted by E.

Figure 5:
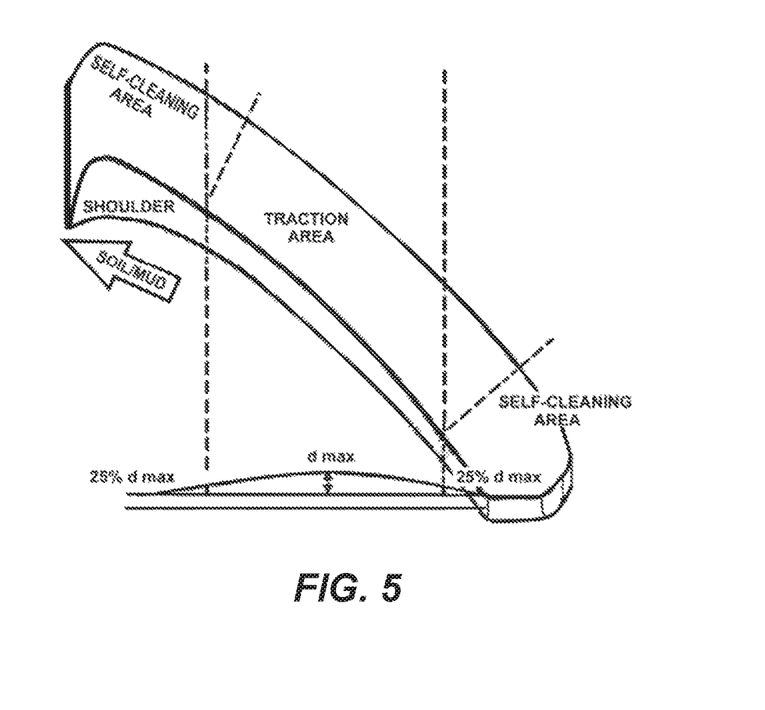
FIG. 5 shows an exemplary front view of the lug of FIG. 4.

Preferably—and with reference to FIG. 5—the nose region 22 of a lug 2 is considered the region within about 33%, preferably within 25%, of the axial length E of the lug 2 from the first end 201 along its axial extension, whereas the shoulder region 23 of a lug 2 is considered the region within about 33%, preferably within 25%, of the axial length E of the lug 2 from the second end 202 along its axial extension.

Each lug 2 has a substantially trapezoidal shape when viewed in a sectional view taken, at any point, in a plane orthogonal to the path connecting the nose 22 with the shoulder 23 along the axial length E. A trapezoidal shape is shown also, for example, in FIG. 3.

The central part of the lug 2 included between ends 201 and 202 as well as between the nose region 22 and the shoulder region 23 is denoted by 27.

The rotating direction R of the tire is indicated with an arrow in FIG. 1. During rotation of the tire each lug 2 of the tread 10 sequentially comes in contact with the ground or engages the soil or mud. The first part of each lug 2 that comes in contact with the ground is the one in the central pad of the tread 10, i.e. the nose 22 of the lug 2. Upon further rotation of the tire the central part 27 of the lug 2 comes in contact with the ground. Finally, upon further rotation of the tire also the part of the lug on the axially outer side of the tread, i.e. the shoulder 23 of the lug 2, comes in contact with the ground.

The rotation direction R of the tire consequently defines one side of the lugs that first comes in contact with the mud or soil in a field, the so called stepping-in or leading side 21 of the lug 2. The opposite side of the stepping-in side 21 of the lug in circumferential direction is the so called stepping-out, or trailing, side 24 of the lug 2.

Lug 2 also includes a radially outer side 25, defining the lug surface opposite to tread ground 11 and arranged substantially orthogonal to the stepping-in side 21 and stepping-out side 24, these latter sides 21 and 24 being connected one to the other by the radially outer side 25.

Therefore, the radially outer side 25 of the lug delimits the lug in radial outer direction and intersects both the stepping in side 21 and stepping-out side 24 of the lug. The intersection of the radial outer side 25 with the stepping-in side 21 is called the leading edge L of the lug. The intersection of the radial outer side 25 with the stepping-out side 24 is called the trailing edge T of the lug.

In the present embodiment, all lugs of the tire 1 have an improved lug profile according to a first preferred embodiment of present invention on each respective sleeping-in side 21. Such improved profile will flow be described with reference to FIGS. 2 to 4.

Figure 2:
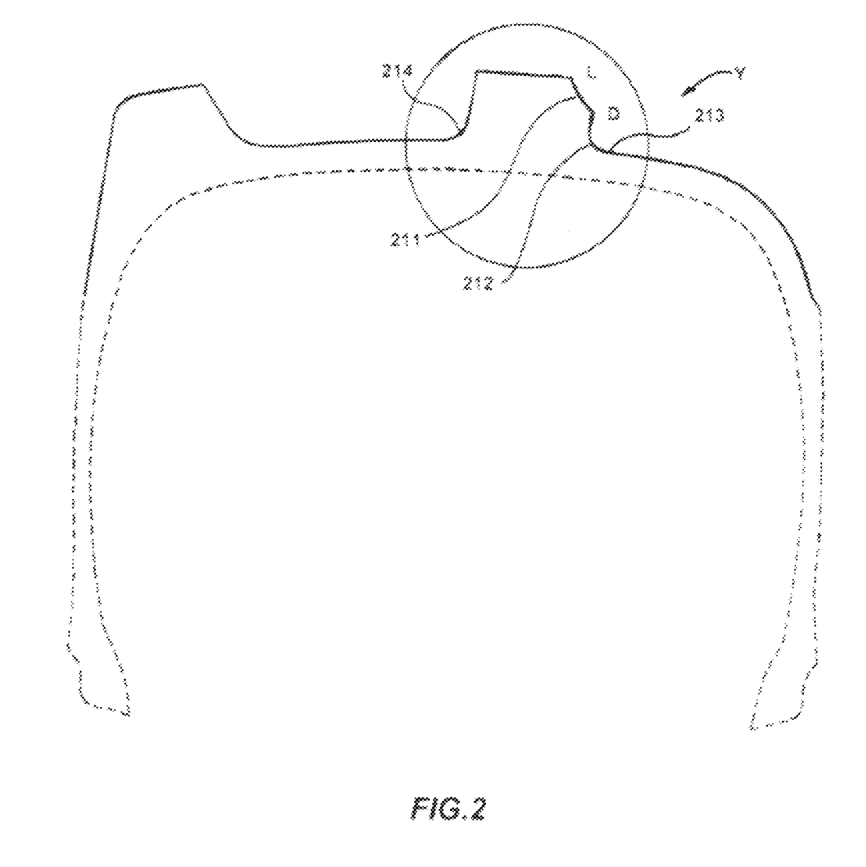
FIG. 2 shows a sectional view of the tire of FIG. 1, taken along plane A-A of this latter figure.

FIG. 2 shows a sectional view of the agricultural tire of FIG. 1 taken along the plane A-A of the latter figure. Particularly, in the detail Y, the section of lug 2 with its lug profile according to a preferred embodiment of the invention can be seen.

The external profile of the stepping-in side 21 of the lug comprises a first, radially outer, concave surface 211 and a second, radially inner, concave surface 212. The first concave surface 211 and the second concave surface 212 intersect each other at a transition point or apex, D. In a preferred embodiment as shown in FIG. 2 the first concave surface 211 intersects the radial outer side 25 of the lug at the leading edge L.

The radially inner end of the second concave surface 212 preferably terminates on the ground 11 of tire tread surface, in order to reduce the stress and strain in the transition area between the second concave surface 212 and the ground 11 of the tread 10 a first smoothening radius 213 can be added between the second concave surface 212 and the ground 11 of the tread 10.

The external profile of the stepping-out side 24 of the lug shown in FIG. 2 is flat or substantially flat. The transition between the sidewall of the stepping-out side 24 of the lug and the surface of the ground 11 of the tread 10 may be rounded with a second smoothening radius 214. The latter may be equal or different from first smoothening radius 213.

As said above, both surfaces 211 and 212 are curved, in particular concave, surfaces. Preferably, each surface 211, 212 develops, at least in each circumferential sectional plane B-B or parallel to B-B, according to a spline curve, i.e. the radius of curvature of each surface 211 and 212 varies along the radial direction.

In the present embodiment, the spline curve of first surface 211 is different from the spline curve of second surface 212.

The greatest radius of curvature of the spline curve of each surface 211 and 212 is smaller than 400 mm, preferably smaller than 350 mm and more preferably smaller than 300 mm.

Alternatively, each surface 211, 212 develops, at least in each circumferential sectional plane B-B or parallel to B-B, according a constant radius of curvature, being part of a spherical profile.

In such alternative embodiments where the radius of curvature of each surface 211 and 212 is constant, the radius of curvature of each surface 211 and 212 is smaller than 400 mm, preferably smaller than 350 mm and more preferably smaller than 300 mm.

The height H of the lug 2 is defined as the distance in radial direction of the tire from the ground 11 of the tread 10 to the radially outer 25.

Figure 3:
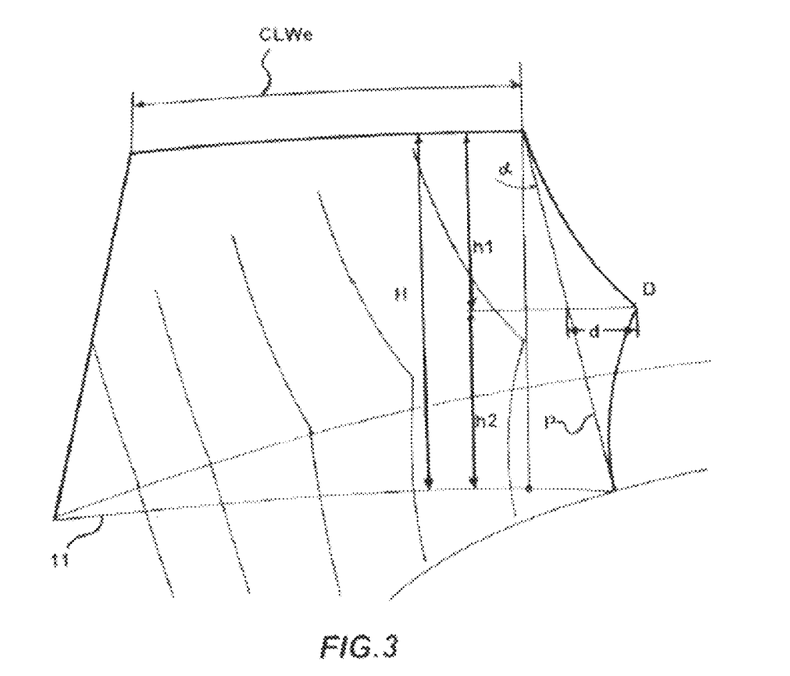
FIG. 3 shows an enlarged schematic representation of a lug profile taken along plane B-B of FIG. 1.

As better shown FIG. 3, the transition point D is positioned at radial distance h1 from the radial outer side 25 of the lug and is positioned at a radial distance h2 from the ground 11 of the tread 10.

In this first preferred embodiment of the invention, the radial distance h1 from the transition point D to the radial outer surface 25 of the tag and the radial distance h2 between the ground 11 of the tread 10 and the transition point D are constant and do not vary along the whole axial length of the lug 2.

In this first preferred embodiment of the invention the radial distance h2 between the ground 11 of the tread 10 and the transition point D is the same as the radial distance h1 from the transition point D to the radial outer surface 25 of the lug.

As said above, in the present embodiment the radial distance h2 between the ground 11 and the transition point D is the same as the radial distance h1 from the transition point D to the radial outer surface 25 of the lug along the whole axial length E of the lug 2.

As can be seen in FIG. 3, the position on the lug profile of the transition edge D is further defined by the circumferential distance d from a reference plane P, i.e. the distance of edge D from plane P in a direction orthogonal to the lug radial height H. The plane P is the plane connecting the radially outer intersection of the first concave surface 211 with the radial outer surface of the lug 25, i.e. the leading edge L, with the radially inner intersection of the second concave surface 212 with the ground 11. In case first smoothening radius 213 is provided, plane P is the plane connecting the radially outer intersection of the first concave surface 211 with the radial outer surface 25 of the lug, i.e. the leading edge L, with the radially inner intersection of the imaginary continuation of the second concave surface 212 with the ground 11 of tread 10.

Figure 3B:
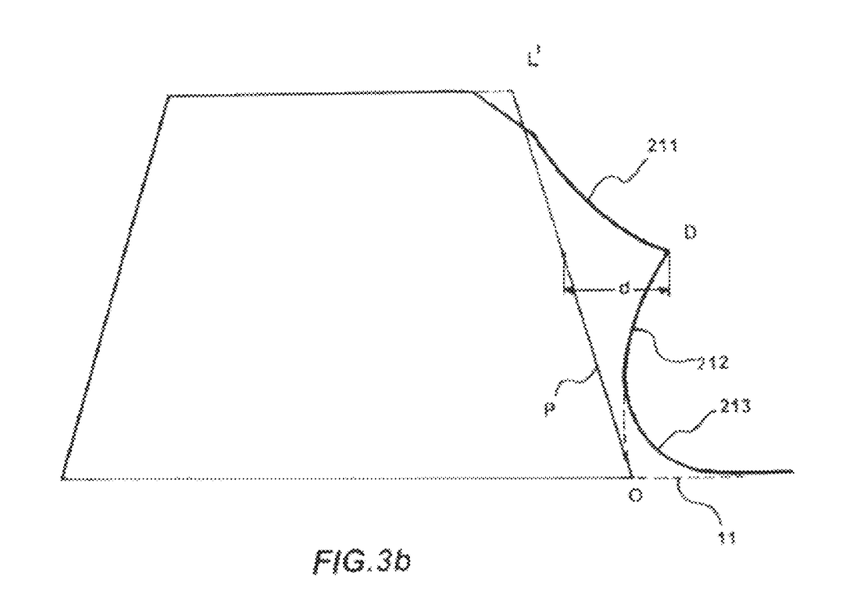
FIG. 3b shows an enlarged schematic representation of a variant lug profile with respect to that of FIG. 3.

FIG. 3b is showing a variant of this preferred embodiment wherein the intersection at the leading edge L is chamfered or flattened as well as wherein a first smoothening radius 213 is provided in the transition area between the second concave surface 212 and the ground of the tread 11. In this case the plane P is the plane connecting the radially outer intersection of the imaginary continuation of the first concave surface 211 with the imaginary continuation of the radial outer surface of the lug 25, i.e. the imaginary leading edge L', with the radially inner intersection of the imaginary continuation of the second concave surface 212 with the ground 11 of the tread 10, i.e. point O in FIG. 3b.

Figure 3C:
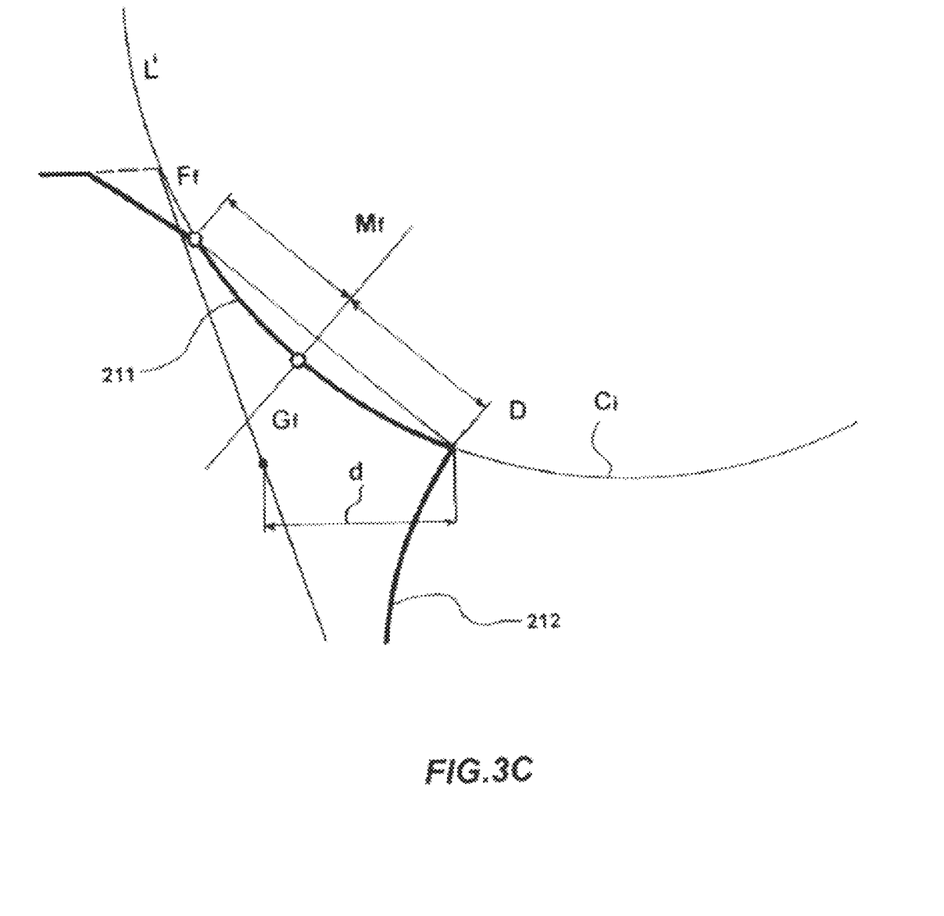
FIG. 3c shows an enlarged schematic representation of a variant lug profile with respect to that of FIG. 3b.

With reference to FIG. 3c, when the first and the second surface are curved according to a spline, the imaginary continuation of the surfaces can be achieved in drawing a circle Ci passing through the following three point: D; the end point Ff of the respective first or second surface 211 or 212; and an intermediate third point Gf defined by the intersection of a plane Mf orthogonal to the line connecting the points D and Ff, such orthogonal plane Mf being positioned at equal distance from D and Ff.

FIG. 3c is showing by way of example the circle defined by the point D, the end point Ff the first surface 211 and the intermediate point Gf along the first surface 211.

Therefore, for the definition of the plane P it is irrelevant whether the intersection is between real surfaces or between imaginary continuations of the mentioned surfaces.

The first concave surface 211 is tangential to the plane P in the leading edge L or in the Imaginary leading edge L.

The second concave surface 212 is tangential to the plane P in the point of radially inner intersection of the second concave surface 212 with the ground 11 of the tread 10 or in the point of the radially inner intersection of the imaginary continuation of the second concave surface 212 with the ground 11 of the tread 10.

The plane P is inclined with respect to a radial plane passing through the intersection point L or L' and orthogonal to the radial outer surface 25 of the lug at an angle $\alpha$.

In a preferred embodiment of this invention the angle $\alpha$ is comprised in the range $0° \leq \alpha \leq 45°$, more preferably in the range $5° \leq \alpha \leq 35°$ and even more preferably in the range $10° \leq \alpha \leq \cong°$ According to present invention in order to achieve the best compromise between the tire performances traction, wear and sell-cleaning, the profile of the stepping-in side 21 varies along the axial length E of the lug 2 from the nose 22 to the shoulder 23.

According to present invention the distance d is not constant along the axial length E of the lug 2 from the nose 22 to the shoulder 23 of the lug.

In a preferred embodiment of this invention the distance d, along the whole axial length E of the lug 2, is comprised in the range $0 \times CLW \leq d \leq 0.5$ CLW, more preferably in the range $0 \times CLW \leq d \leq 0.35$ CLW and even more preferably in the range $0 \times CLW \leq d \leq 0.25$ CLW, wherein CLW is the circumferential width of the lug 2 measured at the radial outer surface 25 of the lug 2 taken in the same circumferential section as the distance d. An exemplary $CLW_e$ is shown in FIGS. 3 and 4.

In the regions of the nose 22 and the shoulder 23 the distance d is smaller than in the central area 27 of the lug 2 along the axial length of the lug 2 as shown in FIGS. 4 and 5.

According to a preferred embodiment of the invention the preferred profile distance d in the nose and shoulder region is in the range $d \leq 0.25$ $d_{max}$ wherein $d_{max}$ is the maximum distance d in the central area 27 of the lug 2.

The nose and shoulder regions of the lugs are the so called self-cleaning areas of the lugs. According to present invention the sidewall of the stepping-in side 21 with a reduced profile width, i.e. a small distance d in the nose region, improves the sell-cleaning in such a way that the channelling of the soil or mud in the area between the lugs is improved. The shoulder region of the lug having a reduced profile width with a small distance d improves the self-cleaning by improving the elimination of soil or mud from the tread.

Preferably the variation of the distance d along the axial length E of the lug 2 from the nose 22 to the shoulder 23 is parabolic and more preferably being zero at the end of the nose and shoulder region i.e. respectively at the first end 201 and the second end 202, of the stepping-in side 21 of the lug 2.

It is understood that other variations of the distance d along the axis of the lug are also encompassed by the present invention.

In a variant preferred embodiment of the invention the same profile disclosed for the stepping-in side 21 of lug 2 comprising the two concave surfaces 211 and 212 intersecting at the transition point D can also extend to a front sidewall of the nose 22 of the lug, as shown in FIG. 4.

A second and third preferred embodiment according to present invention comprise all the features as described in the previous first preferred embodiment with the exception of the radial position of the transition point D.

In a second and third preferred embodiment according to present invention the radial distance h2 between the ground 11 of the tread 10 and the transition point D is not the same as the radial distance h1 from the transition point D to the radial outer surface 25 of the lug 2 along the whole axial length of the lug 2. In those preferred embodiments h1 as well as h2 vary along the axial length of the lug 2.

Figure 6:
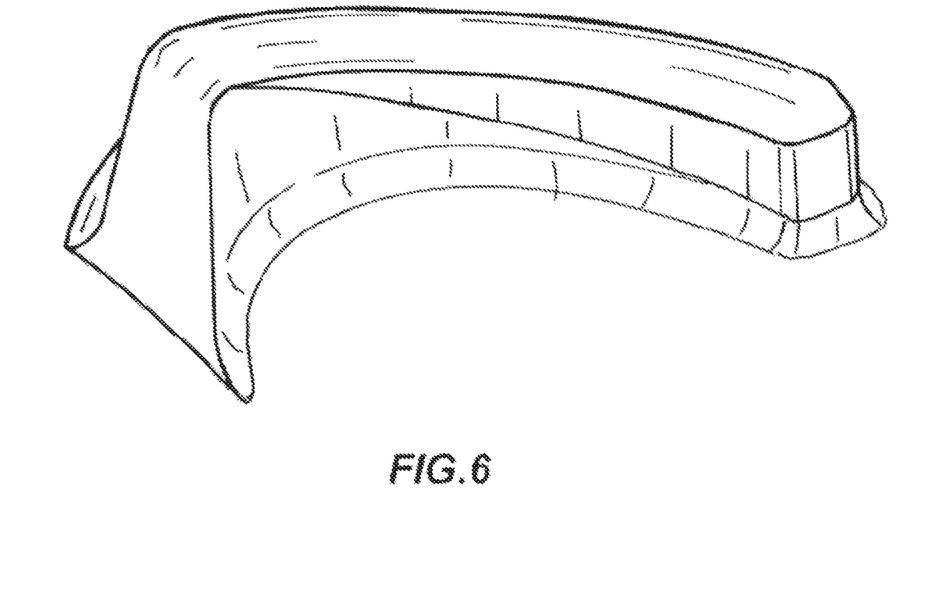
FIG. 6 shows an exemplary perspective view of a single lug of a tire according to a second preferred embodiment of present invention.
Figure 7:
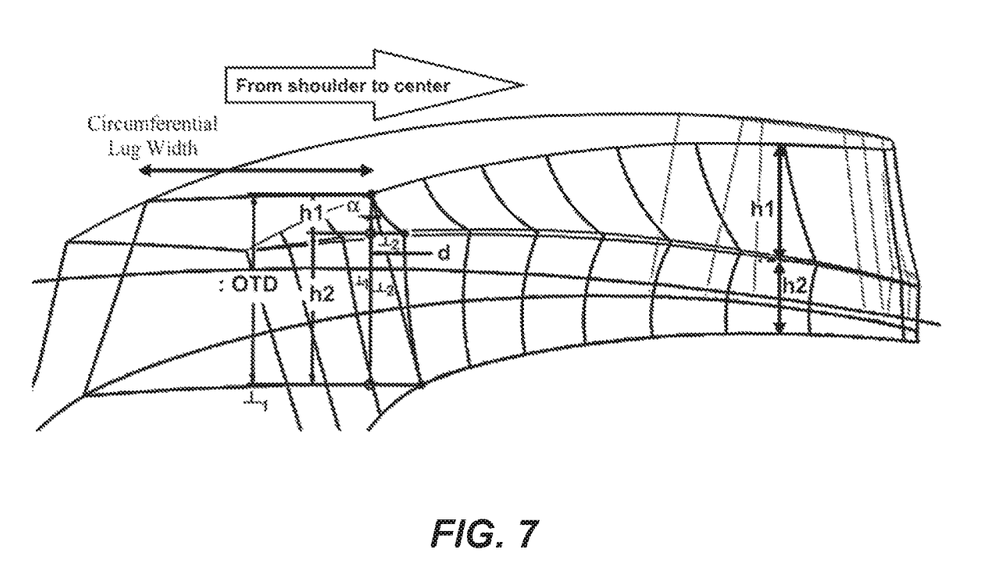
FIG. 7 shows an enlarged schematic representation of a lug profile according to the second preferred embodiment of present invention as shown in FIG. 6, which lug profile is taken along a plane analogous to plane B-B of FIG. 1.

With reference to FIGS. 6 and 7, in a second preferred embodiment of present invention in the shoulder area of the lug 2 the radial distance h2 between the ground 11 of the tread 10 and the transition point D is greater than the radial distance h1 from the transition point D to the radial outer surface 25 of the lug 2 and in the nose area 22 of the lug 2 the radial distance h2 between the ground 11 of the tread 10 and the transition point D is smaller than the radial distance h1 from the transition point D to the radially outer surface 25 of the lug 2.

As can be seen in FIG. 7, in the second preferred embodiment the radial distance h1 continuously increases along the axial length E of the lug 2 from the shoulder 23 to the nose 22 whereby the radial distance h2 consequently continuously decreases along the axial length E of the lug 2 from the shoulder 23 to the nose 22 of the lug 2.

This embodiment is particularly advantageous in field operating conditions where due to the lower inflation pressure of the agriculture tire 1 there is a higher load distribution in the shoulder areas of the agriculture tire 1 and consequently in the shoulder areas of the lugs. A reduced radial distance h1 on the shoulder, i.e. a transition point D closer to the radial outer surface 25 of the lug 2 in the shoulder area, improves the wear-resistance in the shoulder area.

According to a variant of this preferred embodiment of present invention the radial distance h2 between the ground of the tread 11 and the transition point D varies along the axial length of the lug 2 in a linear way. According to another variant of this preferred embodiment of present invention the radial distance h2 between the ground of the tread 11 and the transition point D varies along the axial length of the lug in a non-linear way, preferably curved or parabolic way.

Figure 8:
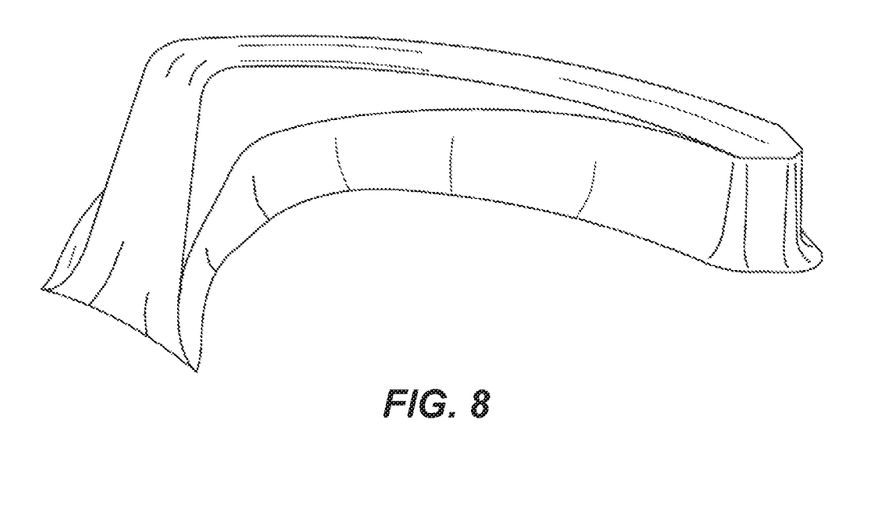
FIG. 8 shows an exemplary perspective view of a single lug of a tire according to a third preferred embodiment of present invention.
Figure 9:
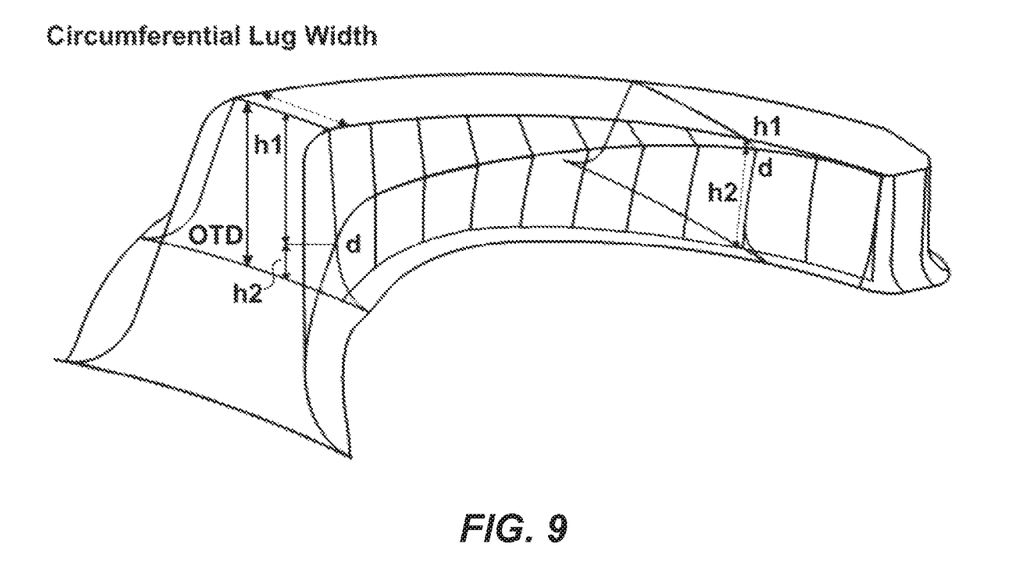
FIG. 9 shows an enlarged schematic view of the lug profile according to the third preferred embodiment of present invention as shown in FIG. 8, which lug profile is taken along a plane analogous to plane B-B of FIG. 1.

With reference to FIGS. 8 and 9, in a third preferred embodiment according to present invention, in the shoulder region 23 the radial distance h2 between the ground 11 of the tread 10 and the transition point D is smaller than the radial distance h1 from the transition point D to the radial eater surface 25 of the lug 2 and in the nose region the radial distance h2 between the ground 11 of the tread 10 and the transition point D is greater than the distance h1 from the transition point D to the radially outer surface 25 of the lug 2.

As can be seen in FIG. D, in the third preferred embodiment the radial distance h1 continuously decreases along the axial length E of the lug from the shoulder to the nose whereby the radial distance h2 consequently continuously increases along the axial length E of the lug from the shoulder to the nose area.

This embodiment is particularly advantageous in road operating conditions where due to the higher inflation pressure of the agriculture tire 1 there is a higher load distribution in the central area of the agriculture tire 1 and consequently of the nose region of the lugs. A reduced radial distance h1 in the nose area, i.e. a transition point D closer to the radially outer surface 25 of the lug 2 in the nose area improves the wear resistance in the central area of the fire.

According to a variant of this preferred embodiment of present invention the racial distance h2 between the ground of the tread 11 and the transition point D varies along the axial length E of the lug 2 in a linear way. According to another variant of this preferred embodiment of present invention the radial distance h2 between the ground 11 of the tread 10 and the transition point D varies along the axial length E of the lug 2 in a non-linear way, preferably curved or parabolic way.

Transition point D can also be implemented as a thin region instead that as a single point. In particular, a junction profile can be applied between the first and the second concave surface. For example, a circular junction may be present, having, in a sectional view like that of FIG. 2, a radius of curvature comprised in a range of about 0.5-1.0 mm. Also in this case, reference may be made to a transition point, meant to indicate also a thin transition region as just defined.

It is understood that the single embodiments can simultaneously be implemented on a single agriculture tire 1 by alternating them on different lugs. The a trend 10 for agriculture tire 1 might comprise a plurality of lugs wherein the plurality of lugs might comprise different groups of plurality of lugs each group according to different embodiments of present invention alternately arranged on the tread. The same agricultural tire 1 might further comprise also standard lugs known in the art.

The present invention has been described so far with reference to preferred embodiments. It is intended that there may be other embodiments which refer to the same inventive concept and fail within the scope of the following claims.

The invention claimed is:

1. A tread (10) for an agricultural tire (1), comprising a plurality of lugs protruding from a ground (11) of the tread (10) in a radially outer direction,
   each lug (2) comprising a stepping-in surface (21) and a radially-outer surface (25),
   wherein the stepping-in surface (21) of at least one lug (2) comprises a first, radially outer, concave curved surface (211) and a second, radially inner, concave curved surface (212) intersecting each other in a transition point (D),
   wherein the transition point (D) is positioned at a circumferential distance (d) from a reference plane (P) connecting a radially outer intersection (L, L') of the first concave curved surface (211) with the radially outer surface (25) and a radially inner intersection (O) of the second concave curved surface (212) with the ground (11),
   characterized in that the circumferential distance (d) of said at least one lug (2) varies along an axial length (E) of the lug (2).

2. The tread (10) of claim 1, wherein the circumferential distance (d) in a central part (27) of said at least one lug (2) is greater than the circumferential distance (d) in a shoulder region (23) of the lug (2) and in a nose region (22) of the lug (2).

3. The tread (10) of claim 2, wherein the circumferential distance (d) in the shoulder region (23) and in the nose region (22) is ≤25% of the maximum circumferential distance ($d_{max}$) in the central part (27) of the lug (2).

4. The tread (10) according to claim 1, wherein the circumferential distance (d) is comprised in the range 0×CLW≤d≤0.5 CLW, wherein CLW is the circumferential width of said at least one lug (2) measured at the radial outer surface (25) and taken in the same circumferential section as the circumferential distance (d).

5. The tread (10) of claim 1, wherein the variation of the circumferential distance (d) along the axial length (E) from a shoulder region (23) to a nose region (22) of said at least one lug (2) is parabolic, preferably being zero at the end of the shoulder and/or nose region.

6. The tread (10) according to claim 1, wherein said reference plane (P) is inclined with respect to a radial plane passing through the intersection point (L, L') of the first concave curved surface (211) with the radially outer surface (25) and orthogonal to the radially outer surface (25) at an angle ($\alpha$), wherein this latter angle ($\alpha$) is comprised in the range $0°\leq\alpha\leq45°$.

7. The tread (10) of claim 1, comprising at least one lug (2) wherein a first radial distance (h1) from the transition point (D) to the radial outer surface of the lug (25) and a second radial distance (h2) from the ground of the tread (11) and the transition point (D) are constant and do not vary along the whole axial length (E) of the lug (2).

8. The tread (10) of claim 7, wherein the second radial distance (h2) is the same as the first radial distance (h1).

9. The tread (10) of claim 1, wherein said first concave curved surface (211) and said second concave curved surface (212) extend onto a front sidewall of a nose region (22) of said at least one lug (2).

10. The tread (10) of claim 1, comprising at least one lug (2) wherein a second radial distance (h2) from the ground of the tread (11) to the transition point (D) varies along the axial length (E) of the lug (2).

11. The tread (10) of claim 10, wherein in a shoulder region (23) of said at least one lug (2) the second radial distance (h2) is greater than a first radial distance (h1) from the transition point (D) to the radially outer surface (25) of the lug (2) and in a nose region (22) of the lug (2) the second radial distance (h2) is smaller than the first radial distance (h1).

12. The tread (10) of claim 10, wherein in a shoulder region (23) of said at least one lug (2) the second radial distance (h2) is smaller than a first radial distance (h1) from the transition point (D) to the radially outer surface (25) of the lug (2) and in a nose region (22) of the lug (2) the second radial distance (h2) is greater than the first radial distance (h1).

13. The tread (10) of claim 10, wherein the second radial distance (h2) between the ground of the tread (11) and the transition point (D) varies in a linear way along the axial length (E) of the lug (2).

14. The tread (10) of claim 10, wherein the second radial distance (h2) between the ground of the tread (11) and the transition point (D) varies in a non-linear way along the axial length (E) of the lug (2).

15. An agriculture tire (1) comprising the tread (10) of claim 1.

16. The tread according to claim 4, wherein the circumferential distance (d) is comprised in the range $0 \times CLW \leq d \leq 0.35$.

17. The tread according to claim 16, wherein the circumferential distance (d) is comprised in the range $0 \times CLW \leq d \leq 0.25\ CLW$.

18. The tread (10) according to claim 6, wherein the latter angle ($\alpha$) is comprised in the range $0°\leq\alpha\leq45°$.

19. The tread (10) according to claim 18, wherein the latter angle ($\alpha$) is comprised in the range $10°\leq\alpha\leq25°$.

20. The tread (10) according to claim 14, wherein the second radial distance (h2) between the ground of the tread (11) and the transition point (D) varies in a parabolic way along the axial length (E) of the lug (2).

* * * * *